July 7, 1959 A. GRECO 2,893,122
COMBINATION MEASURING TAPE AND SCRIBE
Filed March 1, 1956
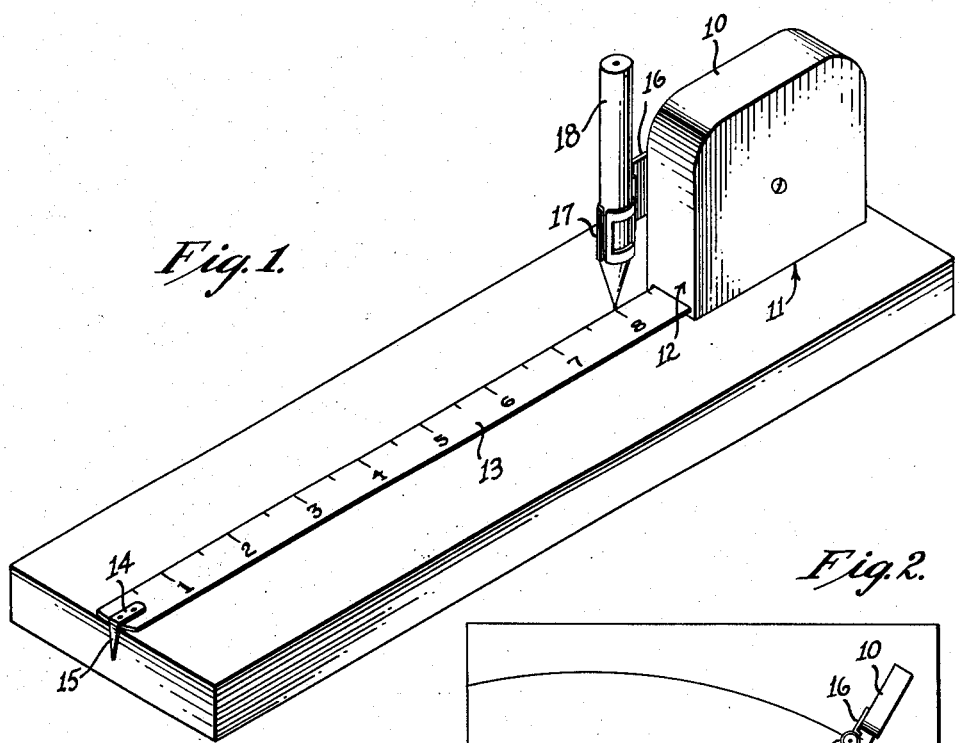
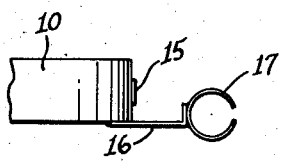
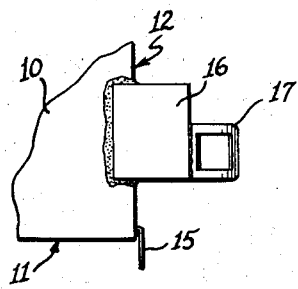
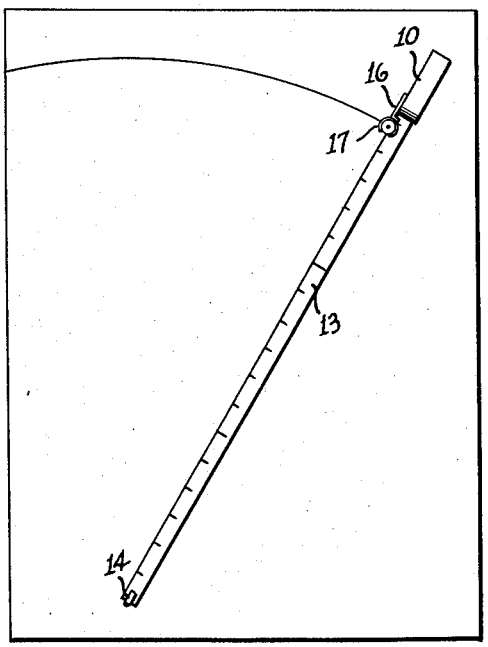
INVENTOR.
ASCANIO GRECO
BY
ATTORNEY.

2,893,122

COMBINATION MEASURING TAPE AND SCRIBE

Ascanio Greco, Philadelphia, Pa.

Application March 1, 1956, Serial No. 568,871

1 Claim. (Cl. 33—27)

This invention relates to measuring devices, and particularly to a combination measuring device and scribe.

Anyone who has ever done any amount of carpentry work, or other work requiring the use of measuring devices, such as scales, tape measures and the like, has no doubt experienced the difficulty of making certain measurements with accuracy. This difficulty often results from the separate motions the carpenter must go through in first measuring off the desired distance, and secondly marking said distance with a pencil or the like. This difficulty is aggravated when measuring distances greater than arm's length with a tape measure.

With the above in mind, it is the basic objective of the present invention to provide a unique combination measuring device and scribe.

It is another object of the present invention to provide a measuring device capable of simultaneous measuring and marking.

It is a further object of this invention to provide a combination tape measure and scribe capable of making accurate measurements and markings at distances greater than arm's length.

Another object of this invention is to provide a combination tape measure and scribe which can be manipulated with only one hand.

A further object of this invention is to provide a combination tape measure and scribe which is capable of scribing great arcs with accuracy.

These objects, together with other objectives and advantages to be derived from the present invention, will at once become apparent from the following detailed description and accompanying drawings, wherein similar numerals refer to similar parts throughout the several views.

Figure 1 is a perspective view of the combination measuring device and scribe of the present invention, illustrating the means by which a simultaneous measurement and marking is made.

Figure 2 is a plan view of the present measuring device and scribe shown in use as describing an arc.

Figure 3 is a plan view of the casing of the present invention, with parts broken away, showing the bracket for holding the scribing means.

Figure 4 is a side elevational view of the casing and bracket shown in Fig. 3.

Referring to the drawings, the combination measuring device and scribe of the present invention is shown as comprising a casing 10, preferably square in configuration, and having a flat bottom surface 11. Mounted within the casing 10, but projecting therefrom through an opening in the front surface 12 of said casing adjacent to the bottom surface 11, is a measuring tape 13. The tape 13 is preferably made from a semi-rigid metallic ribbon, but may be additionally made from a suitable fabric, if desired. Said tape may also be spring-biased so as to resist withdrawal from the casing and to be automatically rewound therewithin. The tape 13 is provided with the usual inch delineations, as shown in Fig. 1. Mounted on the projecting end of the tape 13 is an L-shaped pull-tab 14 having a downwardly depending pointed arm 15.

Fixedly attached to the casing 10 at one side thereof, and projecting forwardly from the front surface 12 of said casing, is a bracket 16 which carries a split cylindrical member 17. The bracket 16 may be attached to said casing by soldering or other suitable attachment means. It will be noted that the cylindrical member 17 lies in a spaced adjacent relationship to the side edge of the tape 13 for a purpose to be described below.

Removably and adjustably mounted in the split cylindrical member 17 is a lead pencil 18 which, if desired, may be replaced by other suitable marking or scribing means. The split nature of the cylindrical member 17 permits the accommodation of pencils of various diameters, and also provides a clamping effect so as to hold the pencil 18 in the desired adjusted position. Since the lead in the pencil 18 substantially coincides with the axial center of the cylindrical member 17, the lead point of said pencil lies adjacent to the side edge of the tape 13, as shown in Fig. 1.

Operation

Although the use and operation of the present device should be quite apparent from the above detailed description of its various parts and their relationship to one another, a brief description of its use will be given below for the sake of clarity and completeness.

For measuring and marking-off distances greater than arms length, such as when measuring board-lengths of lumber, the tape 13 is first pulled slightly from within the casing 10 by grasping the pull-tab 14. The downwardly depending arm 15 of said pull-tab is then made to rest against a vertical edge surface of the surface being measured, as shown in Fig. 1; and the casing 10 is pulled in a direction away from said pull-tab until the desired measurement is reached on the tape. For this purpose, the flat bottom surface 11 of the casing enables said casing to rest upon the surface being measured, as shown. Then, with the point of the pencil 18 bearing against said surface, a slight sidewise movement of the casing 10 will scribe a mark at the exact point of measurement adjacent to the pencil point, as shown in Fig. 1. It is to be noted that this entire operation can be carried out with only one hand, as compared with the usual method of holding the tape with one hand and scribing a mark with the other.

If it is desired to describe an arc, the point of the arm 15 may be pressed slightly into the working surface so as to anchor said arm in place, and the casing 10 pulled away therefrom so as to expose a sufficient length of the tape 13 to mark-off a desired radial distance. Then, with a sweeping or arcuate movement of the casing, the pencil 18 will describe an arc of desired radius, as shown in Fig. 2. It will be noted that this operation can also be carried out with only one hand.

It is apparent from the above description of the present invention that a novel combination measuring tape and scribe is provided so as to facilitate the measuring and marking-off of distances of varying magnitude, particularly distances greater than arm's length. This tape, by its novel construction, is also adapted for measuring and describing great arcs, a feat ordinarily unattainable with the conventional tape measure. And, as has been shown, these operations require the use of only one hand, leaving the user's other hand free for other tasks.

Although the present discussion of this invention has been limited to the above-described preferred embodiment, variations thereof are possible without departing from the spirit of the invention. It is to be understood, therefore, that the invention is not to be limited to the particular embodiment disclosed, but rather only to the inventive concept as defined by the appended claim.

What is claimed is:

A combination measuring tape and scribe comprising, a box-like casing having flat surfaces, said casing having a slotted opening adjacent to one of said flat surfaces, a metallic measuring tape residing within said casing and having one end protruding from said slotted opening, a rigid L-shaped pull-tab fixedly attached to the protruding end of said tape and having a pointed arm depending therefrom, an L-shaped bracket mounted on said casing in spaced relationship with said tape, and a C-shaped metallic clamp carried by said bracket and lying in spaced relationship and adjacent to the side edge of said tape, said clamp being self-expandable to accommodate cylindrical scribing means of various diameters.

References Cited in the file of this patent

UNITED STATES PATENTS

| | | |
|---|---|---|
| 838,463 | Saxton | Dec. 11, 1906 |
| 1,233,034 | Crogan | July 10, 1917 |
| 1,522,280 | Strom | Jan. 6, 1925 |
| 1,544,234 | Janes | June 30, 1925 |
| 1,613,676 | Raphael | Jan. 11, 1927 |
| 1,988,095 | Stockman | Jan. 15, 1935 |
| 2,581,858 | Hilt et al. | Jan. 8, 1952 |